US012626948B2

(12) United States Patent
Wang et al.

(10) Patent No.: US 12,626,948 B2
(45) Date of Patent: May 12, 2026

(54) BATTERY CELL STRUCTURE OF BUTTON BATTERY AND MUNUFACTUTURN MERHOD THEREOF, AND BUTTON BATTERY

(71) Applicant: Zhuhai CosMX Battery Co., Ltd., Zhuhai (CN)

(72) Inventors: Yongwang Wang, Zhuhai (CN); Yuxiang Zeng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 661 days.

(21) Appl. No.: 18/149,658

(22) Filed: Jan. 3, 2023

(65) Prior Publication Data

US 2023/0141846 A1 May 11, 2023

Related U.S. Application Data

(63) Continuation of application No. PCT/CN2021/138942, filed on Dec. 16, 2021.

(30) Foreign Application Priority Data

Dec. 17, 2020 (CN) .......................... 202011496907.3

(51) Int. Cl.
*H01M 10/04* (2006.01)
*H01M 50/202* (2021.01)
(Continued)

(52) U.S. Cl.
CPC ..... *H01M 10/0427* (2013.01); *H01M 50/202* (2021.01); *H01M 50/461* (2021.01); *H01M 50/469* (2021.01)

(58) Field of Classification Search
CPC ........... H01M 10/0427; H01M 50/202; H01M 50/469; H01M 50/461
(Continued)

(56) References Cited

U.S. PATENT DOCUMENTS

2015/0236370 A1* 8/2015 Ensling ............. H01M 10/0427
429/94
2016/0141561 A1* 5/2016 Watanabe ........... H01M 50/103
429/186

FOREIGN PATENT DOCUMENTS

CN 1418386 A 5/2003
CN 104332647 A 2/2015
(Continued)

OTHER PUBLICATIONS

Office Action of CN Patent Application No. 202011496907.3 dated Dec. 25, 2024.
(Continued)

*Primary Examiner* — James M Erwin
(74) *Attorney, Agent, or Firm* — Kilpatrick Townsend & Stockton LLP

(57) ABSTRACT

The present disclosure provides a battery cell structure of a button battery and a manufacturing method thereof, and a button battery, where the battery cell structure of the button battery includes a winding core which is formed by winding a laminated structure and is provided with a hollow inner hole, the laminated structure includes at least one positive electrode sheet, at least one negative plate, and a separator which separates the at least one positive electrode sheet from the at least one negative electrode sheet, at least two ends of the winding core are provided with a separator bonding layer wrapping the winding core, and the separator bonding layer is used for fixing the positive electrode sheet and the negative electrode sheet.

18 Claims, 11 Drawing Sheets

(51) Int. Cl.
    *H01M 50/46*         (2021.01)
    *H01M 50/469*      (2021.01)

(58) Field of Classification Search
    USPC ........................................................ 429/94
    See application file for complete search history.

(56)            References Cited

FOREIGN PATENT DOCUMENTS

| | | | |
|---|---|---|---|
| CN | 207165694 U | 3/2018 | |
| CN | 109768333 A | 5/2019 | |
| CN | 110854306 A | 2/2020 | |
| CN | 111816907 A | 10/2020 | |
| CN | 112531243 A | 3/2021 | |
| CN | 112635847 A | 4/2021 | |
| CN | 213520091 U | 6/2021 | |
| CN | 213936362 U | 8/2021 | |
| DE | 102009008859 A1 | 8/2010 | |
| EP | 2416406 A1 | 2/2012 | |
| EP | 2793285 A2 | 10/2014 | |
| JP | H1122574 A | 5/1989 | |
| JP | 2018014169 A | 1/2018 | |
| KR | 20080015163 A | 2/2008 | |
| WO | 2019176422 A1 | 9/2019 | |

OTHER PUBLICATIONS

The international search report and written opinion received in corresponding International Application PCT/CN2021/138942, mailed Mar. 15, 2022.

Supplementary European Search Report of EP21905806.2 Dated Dec. 20, 2023.

The Notice of Allowance and search report issued in Chinese corresponding application 202011496907.3, mailed on Dec. 1, 2025.

\* cited by examiner

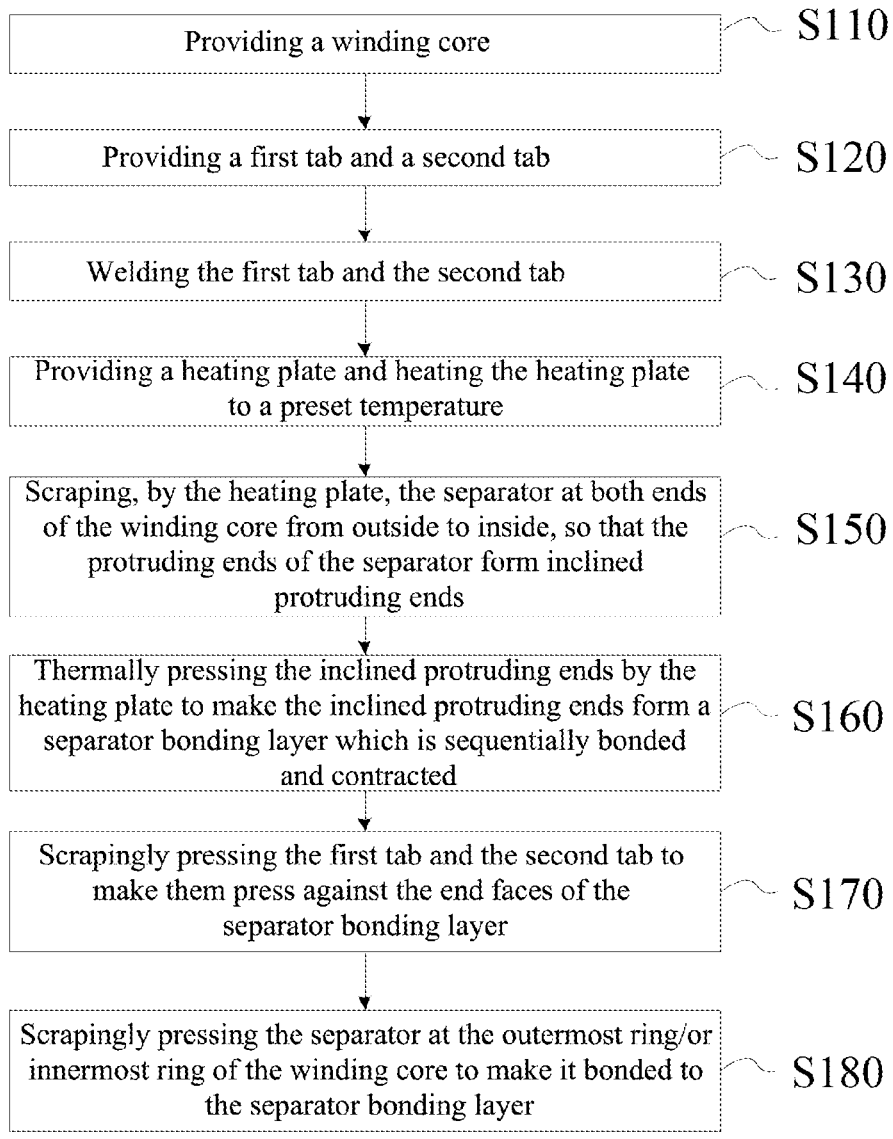

Providing a winding core — S110

Providing a first tab and a second tab — S120

Welding the first tab and the second tab — S130

Providing a heating plate and heating the heating plate to a preset temperature — S140

Scraping, by the heating plate, the separator at both ends of the winding core from outside to inside, so that the protruding ends of the separator form inclined protruding ends — S150

Thermally pressing the inclined protruding ends by the heating plate to make the inclined protruding ends form a separator bonding layer which is sequentially bonded and contracted — S160

Scrapingly pressing the first tab and the second tab to make them press against the end faces of the separator bonding layer — S170

Scrapingly pressing the separator at the outermost ring/or innermost ring of the winding core to make it bonded to the separator bonding layer — S180

FIG. 12

BATTERY CELL STRUCTURE OF BUTTON BATTERY AND MUNUFACTUTURN MERHOD THEREOF, AND BUTTON BATTERY

CROSS-REFERENCE TO RELATED APPLICATION

The present application is a continuation of International Application No. PCT/CN2021/138942, filed on Dec. 16, 2021, which claims priority to Chinese Patent Application No. 202011496907.3, entitled with "BATTERY CELL STRUCTURE OF BUTTON BATTERY AND MANUFAC-TURING METHOD THEREOF, AND BUTTON BAT-TERY", filed with China National Intellectual Property Administration on Dec. 17, 2020. The disclosures of the aforementioned applications are hereby incorporated by reference in their entireties.

TECHNICAL FIELD

The present disclosure relates to the technical field of batteries, and, in particular, to a battery cell structure of a button battery and a manufacturing method thereof, and a button battery.

BACKGROUND

Button batteries have the advantages of stable discharge voltage, wide working temperature range, long storage life and so on, and are widely used in various electronic products. The demand for button batteries in wearable devices such as wireless headphones, sports watches, bracelets, turns and so on is increasing.

Button batteries need to improve the safety for long-term use in harsh environments, particularly in bumpy environments. However, limited by the development of industrial manufacturing level, and market demand, button batteries in the market are mainly primary batteries, while secondary button lithium-ion batteries are basically not sold in the market. Miniaturized electronic products have high requirements for the space size of battery products, and button batteries pose a huge challenge to manufacturing technology due to the reduction of battery size and the improvement of requirements for size consistency. Button batteries with steel housing structure can meet people's needs better. In harsh environments, particularly in bumpy environments or in the case of falling, the battery cell of the existing button battery is easy to generate a phenomenon that a positive electrode sheet and a negative electrode sheet move and shift, result-ing in a short circuit caused by contacting with a metal housing, which affects the use safety.

Under this demand, we urgently need to provide a sec-ondary hard-housing micro lithium-ion battery to meet the needs of the majority of users. By improving a battery cell structure of a button battery and a manufacturing method thereof, and a button battery, the phenomenon that a positive electrode sheet and a negative electrode sheet are easy to move and shift can be effectively solved, thereby avoiding a short circuit caused by contacting with a metal housing in a button battery.

SUMMARY

The present disclosure provides a battery cell structure of a button battery and a manufacturing method thereof, and a button battery, for at least solving the technical problem that a positive electrode sheet and a negative electrode sheet are easy to move and shift, thereby avoiding a short circuit caused by the contact of the positive electrode sheet and the negative electrode sheet with a housing in the button battery, and improving the use safety of button batteries.

In order to achieve the above purpose, the present dis-closure provides a battery cell structure of a button battery, including a winding core which is formed by winding a laminated structure and is provided with a hollow inner hole, where the winding core is provided with a first tab and a second tab, the laminated structure includes at least one positive electrode sheet, at least one negative plate, and a separator which separates the at least one positive electrode sheet from the at least one negative electrode sheet, at least two ends of the winding core are provided with a separator bonding layer wrapping the winding core, and the separator bonding layer is configured to fix the positive electrode sheet and the negative electrode sheet.

In the present disclosure, the separator bonding layer is disposed such that the separator bonding layer wraps the two ends of the winding core, and thus the separator bonding layer covers and wraps the positive electrode sheet and the negative electrode sheet, and wraps the positive electrode sheet or the negative electrode sheet in a sealed region. This limits the positive electrode sheet or the negative electrode sheet to move and shift, so that it can be ensured that the positive electrode sheet and the negative electrode sheet do not come out of the winding core even under severe vibra-tion conditions, for example, in the cases of running or falling, thereby avoiding a short circuit cause by the contact of the positive electrode sheet/or the negative electrode sheet with a battery housing, and improving the use safety of the battery cell structure of the button battery.

In a possible embodiment, the separator extends outwards from both ends of the winding core respectively and forms protruding ends, the protruding ends are inclined toward the direction of the inner hole of the winding core, and the adjacent protruding ends are bonded with each other to form the separator bonding layer.

In a possible embodiment, the width D of the protruding ends is greater than or equal to the sum of the thickness of the positive electrode sheet, the thickness of the negative electrode sheet, and the thickness of the separator.

In a possible embodiment, when the first tab is located at the outer ring of the winding core, the separator is disposed at the outer side of the positive electrode sheet/or the negative electrode sheet connected to the first tab;

the separator bonding layer includes a first separator bonding layer located at the inner side of the first tab and a second separator bonding layer located at the outer side of the first tab, and the bonding force of the first separator bonding layer is greater than that of the second separator bonding layer.

In a possible embodiment, when the first tab is located at the inner ring of the winding core, the separator is disposed at the inner side of the positive electrode sheet/or the negative electrode sheet connected to the first tab;

the separator bonding layer includes a second separator bonding layer located at the inner side of the first tab and a first separator bonding layer located at the outer side of the first tab, and the bonding force of the first separator bonding layer is greater than that of the second separator bonding layer.

In a possible embodiment, the area of the second separator bonding layer covering the first tab accounts for 5% to 30% of the area of the first tab.

In a possible embodiment, before the separator bonding layer is formed, the separator has a width A of 4 mm-10 mm, and after the separator bonding layer is formed, the separator has a width A2 of 3 mm-9 mm.

In a possible embodiment, the positive electrode sheet has a width B of 2 mm-8 mm, and the negative electrode sheet has a width C of 2.5 mm-8.5 mm.

The present disclosure further provides a button battery, including the above battery cell structure of the button battery, where the button battery further includes a housing in which a holding cavity for holding the battery cell structure of the button battery is provided, a bent portion of the first tab is located on at least one end face of the winding core, the bent portion of the first tab contacts the separator bonding layer, and the bent portion of the first tab is electrically connected to an end face of the housing.

The present disclosure further provides a method for manufacturing a battery cell structure of a button battery, the method is used to manufacture the above battery cell structure of the button battery, including:

providing a winding core, where the winding core includes a positive electrode sheet, a negative electrode sheet and a separator separating the positive electrode sheet from the negative electrode sheet;

providing a first tab and a second tab;

welding the first tab and the second tab;

providing a heating plate and heating the heating plate to a preset temperature, including providing an arc heating plate, and a first planar heating plate, and heating the arc heating plate, and the first planar heating plate to a preset temperature which is 122° C. to 128° C.;

scraping, by the heating plate, the separator at both ends of the winding core from outside to inside, so that the protruding ends of the separator form inclined protruding ends;

thermally pressing the inclined protruding ends by the heating plate to form the separator bonding layer which is sequentially bonded and contracted;

scrapingly pressing the first tab and the second tab to make them press against the end faces of the separator bonding layer;

scrapingly pressing the separator at the outermost ring/or innermost ring of the winding core to make the separator bonded to the separator bonding layer.

The present disclosure provides a method for manufacturing a battery cell structure of a button battery, which is used to manufacture the above battery cell structure of the button battery. The method has a simple manufacturing process. In the present disclosure, a separator bonding layer is formed at the both ends of a winding core by a separator using hot-pressing technology, and thus the positive electrode sheet and the negative electrode sheet are completely wrapped in a sealed region. This significantly improves the use safety of button batteries in use for a long time in severe environments, especially in bumpy environments.

For the method for manufacturing the battery cell structure of the button battery provided by the present disclosure, the positive electrode sheet and the negative electrode sheet are completely isolated from the housing of the button battery by forming the separator bonding layer which completely wraps the positive electrode sheet and the negative electrode sheet, so as to avoid a short circuit caused by the moving and shifting of the positive electrode sheet and the negative electrode sheet to contact with the housing of the button battery. The battery cell structure of the button battery and the manufacturing method thereof, and the button battery provided by the present disclosure are convenient to manufacture button batteries. Button batteries manufactured by using the battery cell structure of the button battery provided by the present disclosure can effectively improve the use safety of button batteries, can be normally used without being influenced in bumpy environments, and has a wide application range.

In addition to the technical problems solved by the embodiments of the present disclosure described above, the technical features constituting technical solutions, and the beneficial effects brought by the technical features of these technical solutions, other technical problems that can be solved by the battery cell structure of the button battery and the manufacturing method thereof, and the button battery provided by the present disclosure, other technical features contained in the technical solutions, and the beneficial effects brought by these technical features will be further described in detail in specific embodiments.

BRIEF DESCRIPTION OF DRAWINGS

In order to explain embodiments of the present disclosure or the technical solutions in the prior art more clearly, the following will make a brief introduction to the drawings needed in the embodiments or the prior art description. Apparently, the drawings in the following description are merely a part of embodiments of the present disclosure. For persons of ordinary skill in the art, it is also possible to obtain other drawings from these drawings without paying creative effort.

FIG. 12 is a flowchart of a method for manufacturing a battery cell structure of a button battery according to an embodiment of the present disclosure.

DESCRIPTION OF REFERENCE NUMERALS

Figure 1:
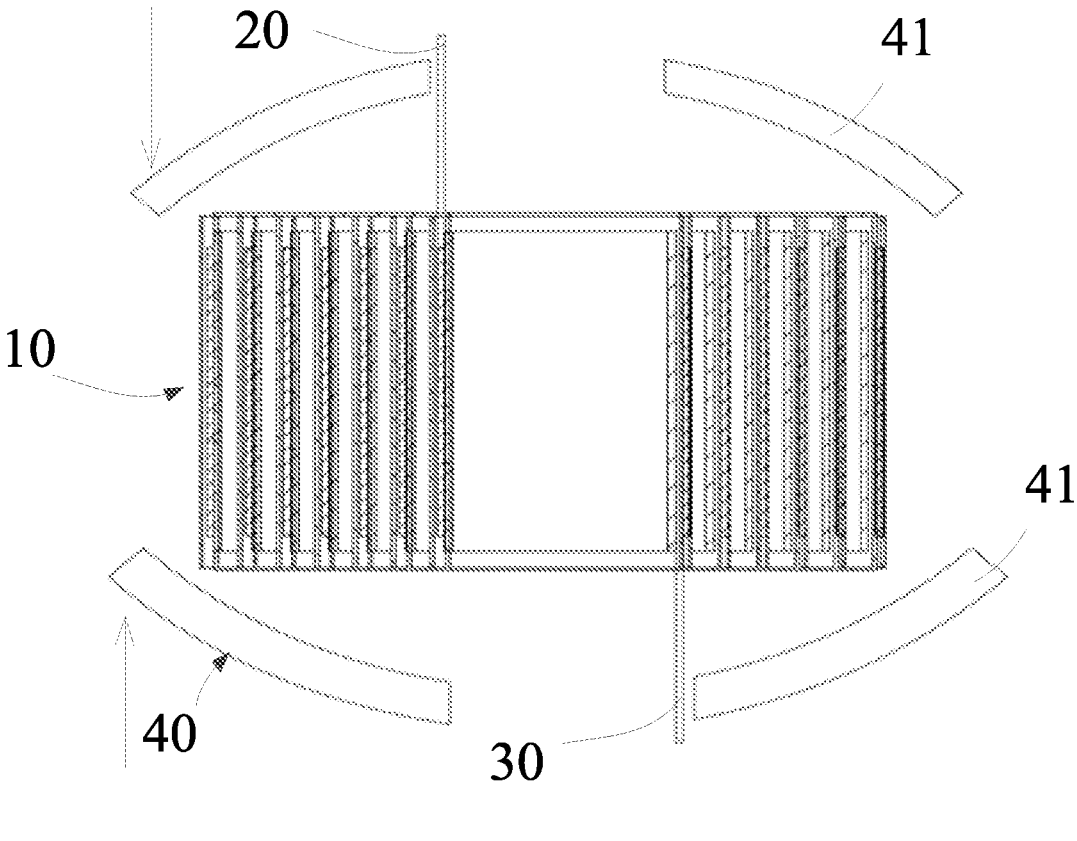
FIG. 1 is a schematic structural diagram in which an arc heating plate is used to extrude a winding core when a first tab and a second tab are both located in an inner ring of the winding core in a method for manufacturing a battery cell structure of a button battery according to an embodiment of the present disclosure.

10—winding core;
11—positive electrode sheet;
12—negative electrode sheet;
13—separator;
131—protruding end;
132—separator bonding layer;
14—inner hole;
20—first tab;
21—bent part;
30—second tab;
40—heating plate;
41—arc heating plate;
42—first planar heating plate;
43—second planar heating plate;
50—housing;
51—holding cavity.

DESCRIPTION OF EMBODIMENTS

To make the objectives, technical solutions, and advantages of the present disclosure clearer, the technical solutions in embodiments of the present disclosure will be described clearly and comprehensively below with reference to the embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

In life, we will find that button batteries are widely used in many ultra-thin, small and exquisite electronic products, such as weighing machines, electronic watches, wireless headphones, and so on. Button batteries have the characteristics of small size and small battery discharge current, are the preferred power supply for the endurance of many electronic products, and also profit the development of electronic products towards miniaturization.

A battery cell structure is a core component of a button battery. The battery cell structure of the button battery is mainly prepared by two preparation processes. One is a lamination process in which a positive electrode sheet, a negative electrode sheet, and a separator are cut into shapes and sizes required for specific production, and then the positive electrode sheet, the separator, and the negative electrode sheet are laminated into a main body of a battery cell; the other is a winding process in which a separator is disposed between a positive electrode sheet and a negative electrode sheet, and then the positive electrode sheet, the negative electrode sheet and the separator are wound into a main body of a battery cell.

The lamination process needs to cut a positive electrode sheet, a negative electrode sheet and a separator into shapes and sizes required for specific production, which is more complicated and requires more production time. The winding process is simple in operation, which only needs to dispose a positive electrode sheet, a negative electrode sheet and a separator into a regular strip-shaped structure with a certain size, so that the winding process is simple and convenient, can be quickly completed, and is easy to realize industrial automation. Therefore, the battery cell structures of most button batteries adopt the winding process.

However, in harsh environments, particularly in bumpy environments or in the case of falling, the existing button batteries are easy to generate a phenomenon that a positive electrode sheet and a negative electrode sheet move and shift, resulting in a short circuit caused by contacting with a metal housing, which affects the use safety.

In view of the above background, a battery cell structure of a button battery and a manufacturing method thereof, and a button battery provided by the present disclosure improves a battery cell structure of a button battery and a manufacturing method thereof, and a button battery, so as to avoid a phenomenon that a positive electrode sheet and a negative electrode sheet move and shift in bumpy environments or in the case of falling, thereby avoiding a short circuit and improving the service life and the use safety.

Figure 7:
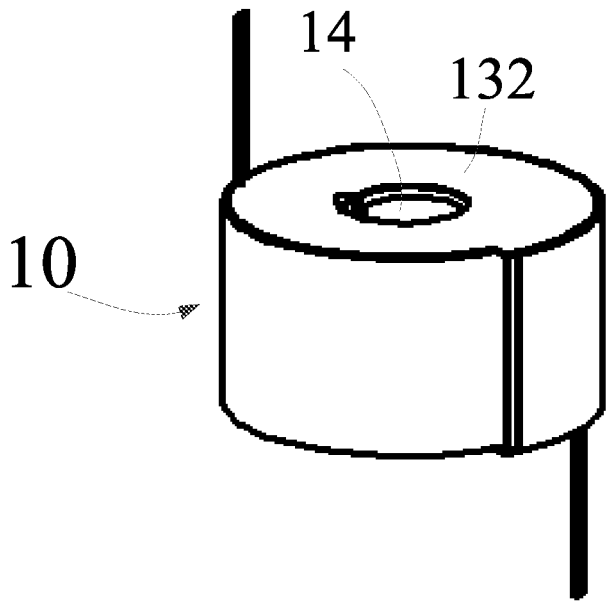
FIG. 7 is a schematic structural diagram of a battery cell structure of a button battery according to an embodiment of the present disclosure.
Figure 8:
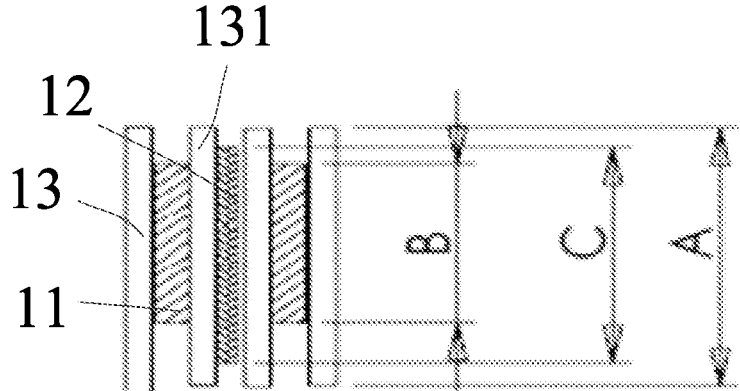
FIG. 8 is a schematic partial structural diagram of a battery cell structure of a button battery before a separator is scraped according to an embodiment of the present disclosure.

As shown in FIG. 7 and FIG. 8, a battery cell structure of a button battery includes a winding core 10 which is formed by winding a laminated structure and is provided with a hollow inner hole 14. The laminated structure includes at least one positive electrode sheet 11, at least one negative plate 12 and a separator 13 which separates the at least one positive electrode sheet 11 from the at least one negative electrode sheet 12. At least two ends of the winding core 10 are provided with a separator bonding layer 132 wrapping the winding core, and the separator bonding layer 132 is used for fixing the positive electrode sheet 11 and the negative electrode sheet 12. The separator bonding layer 132 enable the positive electrode sheet 11 and the negative electrode sheet 12 to be steadily wrapped in a sealed region, thereby avoiding a short circuit caused by the moving and shifting of the positive electrode sheet 11 and the negative electrode sheet 12 to contact with a battery housing 50 when the button battery is subject to severe vibration such as falling, and improving the use safety.

The inner hole 14 is located at the center of the winding core 10 and passes through both end faces of the winding core 10.

Figure 6:
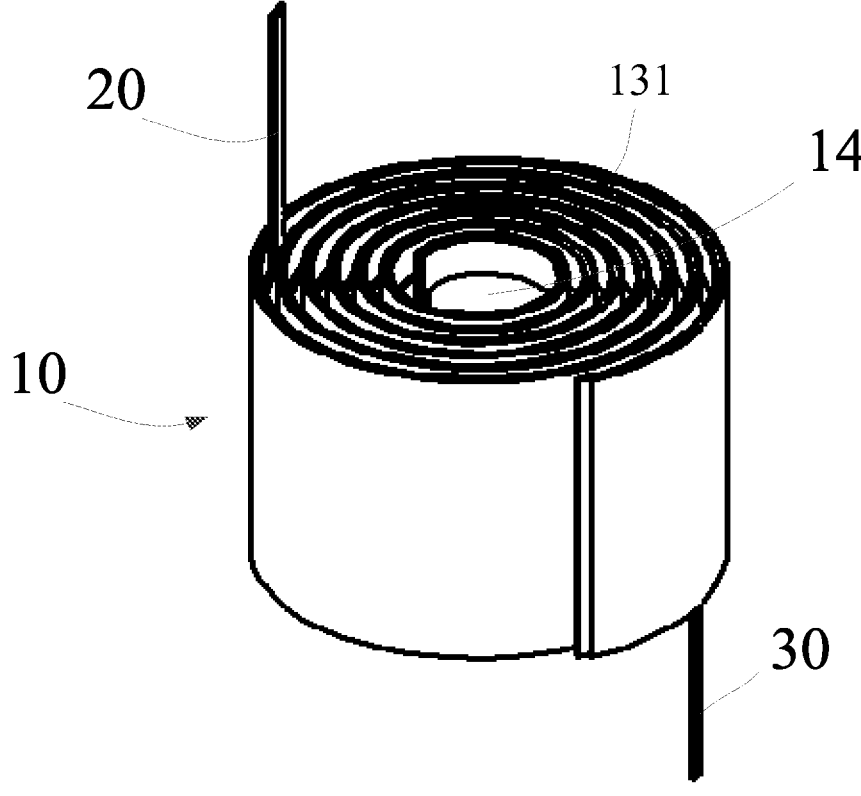
FIG. 6 is a schematic structural diagram of a battery cell structure of a button battery before hot pressing according to an embodiment of the present disclosure.
Figure 9:
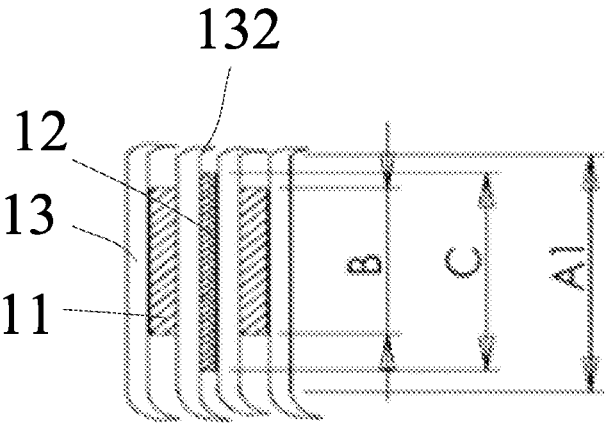
FIG. 9 is a schematic partial structural diagram of a battery cell structure of a button battery after a separator is scraped according to an embodiment of the present disclosure.
Figure 10:
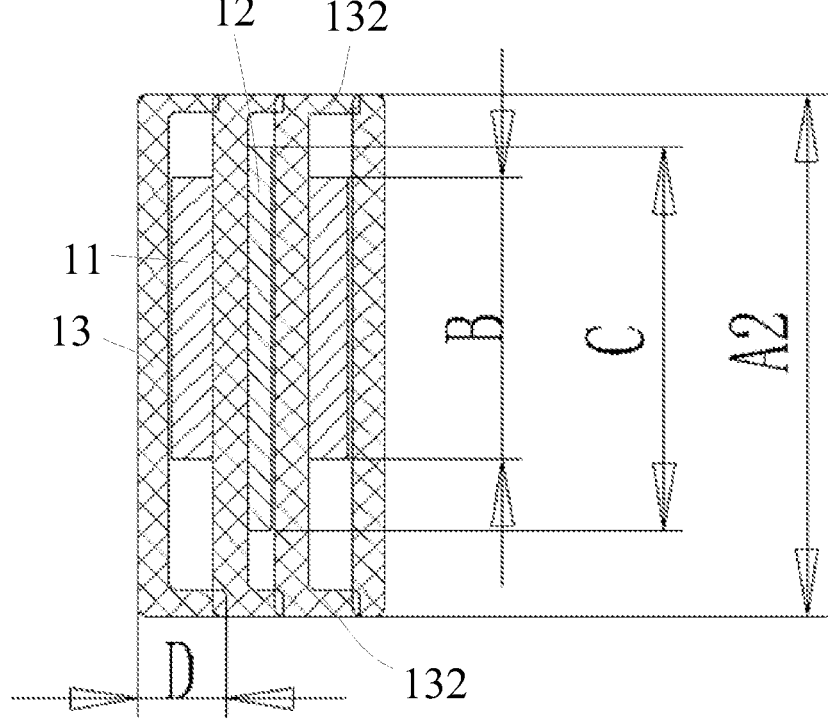
FIG. 10 is a schematic partial structural diagram of a battery cell structure of a button battery after a separator bonding layer is formed according to an embodiment of the present disclosure.

As shown in FIG. 6 and FIG. 8, the separator 13 extends outward from both ends of the winding core 10 and forms protruding ends 131. As shown in FIG. 9 and FIG. 10, the protruding ends 131 are inclined toward the direction of the inner hole 14 of the winding core 10, and adjacent protruding ends 131 are bonded with each other to form the separator bonding layer 132.

It is easy to understand that both sides of the separator 13 respectively extend outward from both ends of the winding core 10. That is, the separator 13 extends, along the axial direction of the winding core 10, from both ends of the winding core 10 to the direction away from the winding core 10.

Specifically, in the laminated structure, the width of the separator 13 is greater than that of each positive electrode sheet 11, and the width of the separator 13 is also greater than that of each negative electrode sheet 12, so that after the laminated structure is wound along the length direction of the separator 13 to form the winding core 10, the separator 13 is remained at both ends of the winding core 10, and the remaining separator 13 beyond the winding core 10 is the protruding ends 131.

As shown in FIG. 6 and FIG. 8, the winding core 10 may be formed by sequentially stacking a positive electrode sheet 11, a separator 13, a negative electrode sheet 12, and another separator 13 from top to bottom or from bottom to top to form a laminated structure, then subjecting the laminated structure to a winding process; the winding core 10 may also be formed by sequentially stacking a negative electrode sheet 12, a separator 13, a positive electrode sheet 11, and another separator 13 from top to bottom or from bottom to top to form a laminated structure, then subjecting the laminated structure to a winding process.

Of course, the laminated structure may also be disposed by alternately stacking a plurality of negative electrode sheets 12 and a plurality of positive electrode sheets 11 in order, and disposing separators 13 at the upper and lower sides of each negative electrode sheet 12/or each positive electrode sheet 11 for completely separating each negative electrode sheet 12 from each positive electrode sheet 11. The laminated structure is formed into the winding core 10 by a winding process. Even after the winding core 10 is wound, it should be ensured that the negative electrode sheet 12 is not in contact with the positive electrode sheet 11 to avoid a short circuit.

The separator 13 is used to prevent the negative electrode sheet 12 from contacting with the positive electrode sheet 11 to cause a short circuit. The separator 13 needs to ensure that each negative electrode sheet 12 is completely separated from each positive electrode sheet 11 to prevent contact. The separator 13 is not limited to being disposed between each negative electrode plate 12 and each positive electrode plate 11, and may also be sleeved on each negative electrode plate 12, or on each positive electrode sheet 11, so that each negative electrode sheet 12 is completely separated from each positive electrode sheet 11.

The separators 13 are located outside and inside the at least one positive electrode sheet 11/or outside and inside the at least one negative electrode sheet 12 so that each positive electrode sheet 11 is completely separated from each negative electrode sheet 12. That is, the separators 13 are located outside and inside the at least one positive electrode sheet 11 so that each positive electrode sheet 11 is completely separated from each negative electrode sheet 12. Alternatively, the separators 13 are located outside and inside the at least one negative electrode sheet 12 so that each positive electrode sheet 11 is completely separated from each negative electrode sheet 12.

As shown in FIG. 6, the winding core 10 is spirally wound so as to have distinct spiral rings at both ends of the winding core 10, and the protruding ends 131 of the separator 13 at each ring are inclined toward the direction of the inner hole 14 of the winding core 10 and bonded to the protruding ends 131 of the separator 13 at an adjacent inner ring.

As shown in FIG. 10, the protruding ends 131 of the separator 13 at each ring partially overlap with the protruding ends 131 of the separator 13 at the adjacent inner ring. Therefore, in order to ensure that the protruding ends 131 of the separator 13 at each ring partially overlap with the projecting ends 131 of the separator 13 at the adjacent inner ring, the width D of the protruding ends 131 needs to satisfy that D is greater than or equal to the sum of the thickness of the positive electrode sheet 11, the thickness of the negative electrode sheet 12, and the thickness of the separator 13.

As shown in FIG. 6 and FIG. 7, a first tab 20 and a second tab 30 are respectively disposed at both ends of the winding core 10, one of the first tab 20 and the second tab 30 is a positive tab, the other of the first tab and the second tab 30 is a negative tab, the positive tab is connected to the positive electrode sheet 11, and the negative tab is connected to the negative electrode sheet 12.

As shown in FIG. 6 and FIG. 7, when the first tab 20 is located at an outer ring of the winding core 10, the second tab 30 is located at the outer ring of the winding core 10, and one of the first tab 20 and the second tab 30 is connected to the upper end of the winding core 10, and the other of the first tab 20 and the second tab 30 is connected to the lower end of the winding core 10. The first tab 20 is located at the outer ring of the winding core 10, which refers to that the position where the first tab 20 and the positive electrode sheet 11/or the negative electrode sheet 12 are connected is located at an outer ring layer of the winding core 10, and the outer refers to a portion of the winding core close to the housing 50 of the button battery.

As shown in FIG. 6 and FIG. 7, when the first tab 20 is located at the outer ring of the winding core 10, the separator 13 is disposed at the outer side of the positive electrode sheet 11/or the negative electrode sheet 12 connected to the first tab 20; the separator bonding layer 132 includes a first separator bonding layer located at the inner side of the first tab 20 and a second separator bonding layer located at the outer side of the first tab 20, and the bonding force of the first separator bonding layer is greater than that of the second separator bonding layer; the separator 13 is disposed at the outer side of the positive electrode sheet 11/negative electrode sheet 12 connected to the second tab 30; the separator bonding layer 132 includes a first separator bonding layer located at the inner side of the second tab 30 and a second separator bonding layer located at the outer side of the second tab 30, and the bonding force of the first separator bonding layer is greater than that of the second separator bonding layer. When processing the first separator bonding layers, it is necessary to use a heating plate 40 to scrape the protruding ends 131 of the separator 13 at both ends of the winding core 10 from the edge of the winding core 10 toward the direction of the inner hole 14 in the center of the winding core 10. Except for a layer of the separator 13 disposed at the outer ring of the positive electrode sheet 11/or the negative electrode sheet 12 connected to the first tab 20 and the second tab 30, the protruding ends 131 of the remaining separator 13 disposed at the inner rings of the positive electrode sheet 11/or the negative electrode sheet 12 are all scraped toward the direction of the inner hole 14 in the center of the winding core 10, so that the protruding ends 131 of the separator 13 are inclined. Then the inclined protruding ends 131 at both ends of the winding core 10 are bonded and contracted by plane hot pressing to form the first separator bonding layers, and the bonding force of the first separator bonding layer is greater than that of the second separator bonding layer.

Where, the bonding force refers to that after the separator bonding layer 132 is formed, the separator bonding layer 132 is separated by a force, and the amount of the force required to separate the separator bonding layer 132 represents the bonding force. The greater the bonding force, the greater the force required to separate the separator bonding layer 132.

Figure 2:
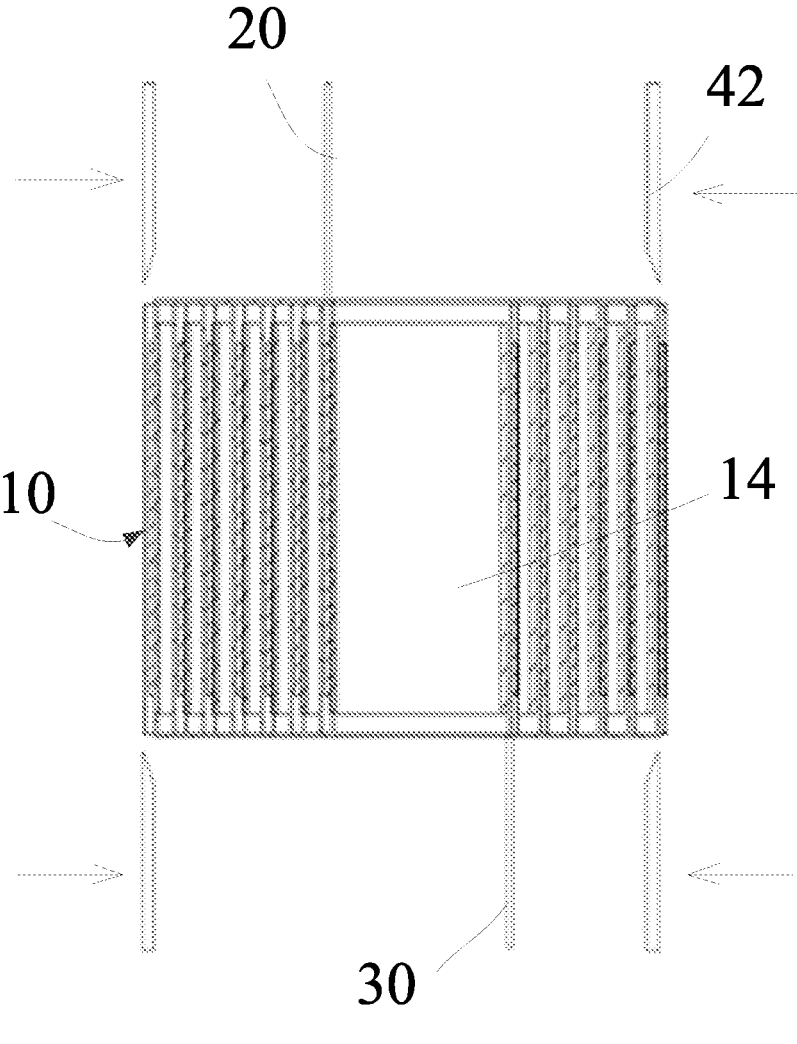
FIG. 2 is a schematic structural diagram in which a first planar heating plate is used to extrude a winding core when a first tab and a second tab are both located in an inner ring of the winding core in a method for manufacturing a battery cell structure of a button battery according to an embodiment of the present disclosure.

As another implementation of this embodiment, as shown in FIG. 1 and FIG. 2, when the first tab 20 is located at the inner ring of the winding core 10, the second tab 30 is located at the inner ring of the winding core 10, one of the first tab 20 and the second tab 30 is connected to the upper end of the winding core 10, and the other of the first tab 20 and the second tab 30 is connected to the lower end of the winding core 10.

As shown in FIG. 1 and FIG. 2, when the first tab 20 is located at the inner ring of the winding core 10, the separator 13 is disposed at the inner side of the positive electrode sheet 11/or the negative electrode sheet 12 connected to the first tab 20; the separator bonding layer 132 includes a second separator bonding layer located at the inner side of the first tab 20 and a first separator bonding layer located at the outer side of the first tab 20, and the bonding force of the first separator bonding layer is greater than that of the second separator bonding layer; the second tab 30 is located at the inner ring of the winding core 10, and the separator 13 is disposed at the inner side of the positive electrode sheet 11/or the negative electrode sheet 12 connected to the second tab 30; the separator bonding layer 132 includes a second separator bonding layer located at the inner side of the second tab 30 and a first separator bonding layer located at the outer side of the second tab 30, and the bonding force of the first separator bonding layer is greater than that of the second separator bonding layer. When processing the first separator bonding layers, it is necessary to use a heating plate 40 to scrape the protruding ends 131 of the separator 13 at both ends of the winding core 10 from the edge of the winding core 10 toward the direction of the inner hole 14 in the center of the winding core. Except for a layer of the separator 13 disposed at the inner ring of the positive electrode sheet 11/or the negative electrode sheet 12 connected to the first tab 20 and the second tab 30, the protruding ends 131 of the remaining separator 13 disposed at the outer rings of the positive electrode sheet 11/or the negative electrode sheet 12 are all scraped toward the direction of the inner hole 14 in the center of the winding core 10, so that the protruding ends 131 of the separator 13 are inclined. Then the inclined protruding ends 131 at both ends of the winding core 10 are bonded and contracted by plane hot pressing to form the first separator bonding layers. The bonding force of the first separator bonding layer is greater than that of the second separator bonding layer. The first tab 20 is located at the inner ring of the winding core 10, which refers to that the position where the first tab 20 and the positive electrode sheet 11/or the negative electrode sheet 12 are connected is located at an inner ring layer of the winding core 10, and the inner refers to a portion of the winding core 10 close to the inner hole 14.

Figure 11:
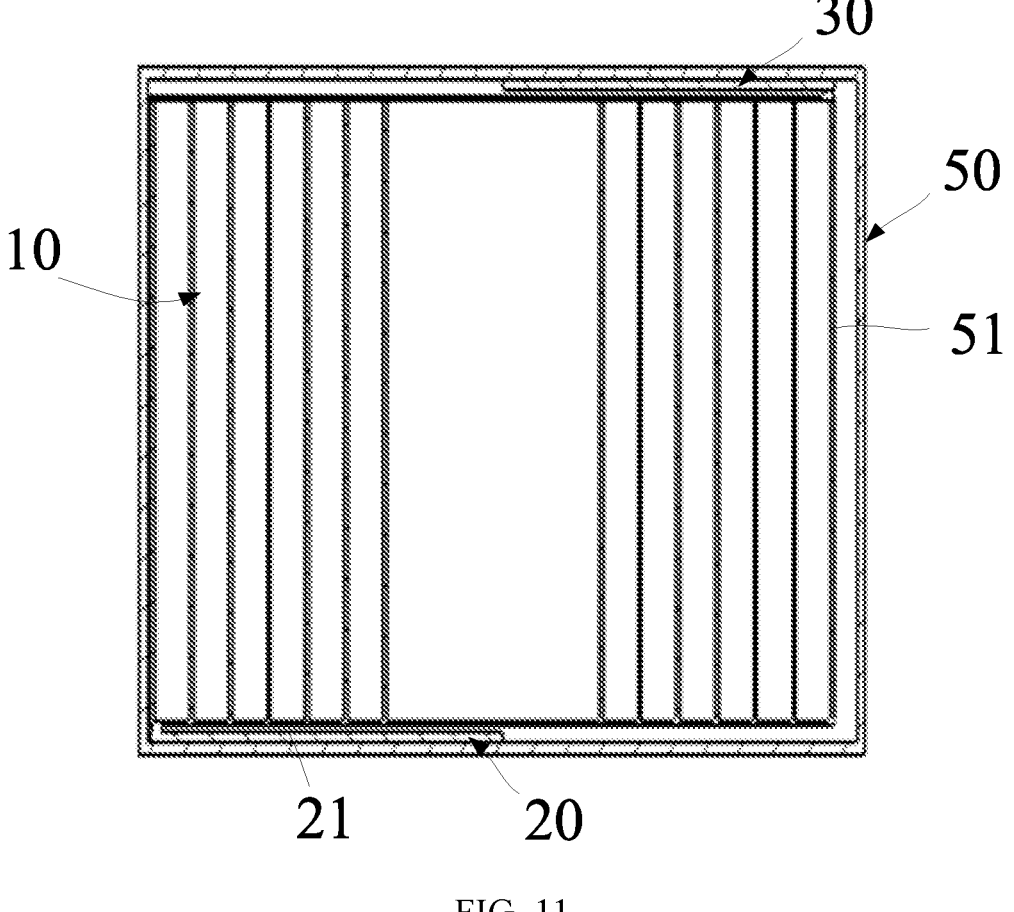
FIG. 11 is a structural schematic diagram of a battery cell structure of a button battery when mounted with a housing according to an embodiment of the present disclosure.

As shown in FIG. 11, the first tab 20 and the second tab 30 are subjected to scrapingly pressing after hot pressing, so that the separator 13 at the outermost ring is subjected to scrapingly pressing on the end faces of the separator bonding layer 132 by the first tab 20 and the second tab 30, and the bonding force between the separator 13 at the outermost ring and the separator 13 at the secondary outer ring is smaller than the bonding force between the separators 13 at the other rings.

Particularly, when the first tab 20 is located at the outer ring of the winding core 10, the second tab 30 is located at the inner ring of the winding core 10, and one of the first tab 20 and the second tab 30 is connected to the upper end of the winding core 10 and the other one of the first and second tabs 20 and 30 is connected to the lower end of the winding core 10, the separators 13 are respectively disposed at the outer side of the positive electrode sheet 11/or the negative electrode sheet 12 connected to the first tab 20 and the inner side of the positive electrode sheet 11/or the negative electrode sheet 12 connected to the second tab 30. In this case, the separator bonding layer 132 includes a first separator bonding layer located at the inner side of the first tab 20, a first separator bonding layer located at the outer side of the second tab 30, a second separator bonding layer located at the outer side of the first tab 20, and a second separator bonding layer located at the inner side of second tab 30. The bonding force of the first separator bonding layer is greater than that of the second separator bonding layer.

The area of the second separator bonding layer covering the first tab 20 accounts for 5% to 30% of the area of the first tab 20, and the area of the second separator bonding layer covering the second tab 30 accounts for 5% to 30% of the area of second tab 30.

The battery cell structure of a button battery provided by the present disclosure is mounted in the housing 50 for encapsulating, the winding core 10 is connected to the metal housing 50 of the button battery through a negative electrode tab, and the winding core 10 is connected to the metal housing 50 of the button battery through a positive electrode tab.

In the present embodiment, as shown in FIG. 8 and FIG. 9, before the separator bonding layer 132 is formed, the separator 13 has a width A of 4 mm-10 mm, and after the separator bonding layer 132 is formed, the separator 13 has a width A2 of 3 mm-9 mm. The positive electrode sheet 11 has a width B of 2 mm-8 mm, and the negative electrode sheet 12 has a width C of 2.5 mm-8.5 mm.

In the present embodiment, the separator 13 may be a 5+2+2 µm macroporous separator in oil system, which has a melting point of 125° C. An aluminum foil having a thickness of 10 m can be used as the base material of the positive electrode sheet 11, and a coating layer having a thickness of 75 µm is applied to both the front and back surfaces of the base material of the positive electrode sheet 11. A copper foil having a thickness of 5 µm is used as the base material of the negative electrode sheet 12, and a coating layer having a thickness of 85 µm is applied to both the front and back surfaces of the base material of the negative electrode sheet 12.

Preferably, the winding core 10 has a diameter of 10 mm and a width of 5.5 mm, the separator 13 has a width A of 5.5 mm, the negative electrode sheet 12 has a width C of 4 mm, and the positive electrode sheet 11 has a width B of 3.5 mm.

As shown in FIG. 11, the present disclosure further provides a button battery, including the above battery cell structure of the button battery, and further including a housing 50, where a holding cavity 51 for holding the battery cell structure of the button battery is disposed in the housing 50, a housing cover for sealing the holding cavity 51 is disposed on the housing 50, and the housing 50 is used for encapsulating the battery cell structure of the button battery therein to protect the battery cell structure of the button battery.

One end of the first tab 20 is connected to the positive electrode sheet 11/or the negative electrode sheet 12. The middle portion of the first tab 20 is bent to form a bent portion 21 that is approximately parallel to the end face of the winding core 10, and the bent portion 21 extends toward the other end of the first tab 20. The bent portion 21 of the first tab 20 is located on at least one end face of the winding core 10, the bent portion 21 of the first tab 20 contacts the separator bonding layer 132, and the bent portion 21 is electrically connected to an end face of the housing 50.

Specifically, one surface of the bent portion 21 is in contact with the first separator bonding layer of the separator bonding layer 132, and the other surface of the bent portion 21 of the first tab 20 is in contact with an end face of the housing 50 to achieve electrical connection.

In the existing winding core 10, the protruding ends 131 of the separator 13 is loose and has a low strength, so that the insulating effect cannot be performed well. Therefore, it is necessary to paste insulating bonding papers on the end faces of the existing winding core 10 to insulate the first tab 20 from the two end faces of the winding core 10. In the button battery provided by the present application, the end faces of the winding core 10 are provided with the separator bonding layer 132 wrapping the winding core 10, the separator bonding layer 132 wraps and tightens the winding core, and the separator bonding layer 132 insulates the first tab 20 from the two end faces of the winding core. Therefore, the first tab 20 can be directly bent to contact the separator bonding layer 132, and there is no need to use the insulating bonding paper, thereby simplifying the structure of the button battery.

The present disclosure further provides a manufacturing method of a battery cell structure of a button battery, as shown in FIG. 12, for manufacturing the above battery cell structure of the button battery, including the following steps:

step S110, providing a winding core 10, where the winding core 10 includes a positive electrode sheet 11, a negative electrode sheet 12 and a separator 13 separating the positive electrode sheet 11 from the negative electrode sheet 12, and FIG. 8 is a schematic partial structural diagram of the provided winding core 10;

step S120, providing a first tab 20 and a second tab 30, where one of the first tab 20 and the second tab 30 is a positive tab, and the other of the first tab 20 and the second tab 30 is a negative tab;

step S130, welding the first tab 20 and the second tab 30, where the positive tab in the first tab 20 and the second tab 30 is connected to the positive electrode plate 11, and the negative tab in the first tab 20 and second tab 30 is connected to the negative electrode plate 12;

step S140, providing a heating plate 40 and heating the heating plate 40 to a preset temperature;

step S150, scraping, by the heating plate 40, the separator 13 at both ends of the winding core 10 from outside to inside, so that the protruding ends 131 of the separator 13 form inclined protruding ends 131;

step S160, thermally pressing the inclined protruding ends 131 by the heating plate 40 to make the inclined protruding ends 131 form a separator bonding layer 132 which is sequentially bonded and contracted, and specifically to make the inclined protruding ends 131 form a first separator bonding layer which is sequentially bonded and contracted;

Step S170, scrapingly pressing the first tab 20 and the second tab 30 to make them press against the end faces of the separator bonding layer 132; specifically, scrapingly pressing the first tab 20 and the second tab 30 to make them press against the first separator bonding layer of the separator bonding layer 132;

Step S180, scrapingly pressing the separator 13 at the outermost ring/or innermost ring of the winding core 10 to make it bonded to the separator bonding layer 132; specifically, scrapingly pressing the separator 13 at the outermost ring/or innermost ring of the winding core 10 to make it bonded to the separator bonding layer 132 to form a second separator bonding layer.

The manufacturing method of the battery cell structure of the button battery provided by the present disclosure has simple manufacturing process and can be used for large-scale production, and the manufactured battery cell structure of the button battery has good safety. In the present disclosure, a hot pressing process is adopted to enable a separator 13 to form a separator bonding layer 132 at both ends of a winding core 10 to completely wrap a positive electrode sheet 11 and a negative electrode sheet 12 in a sealed region, so that the positive electrode sheet 11 and the negative electrode sheet 12 are effectively prevented from moving and shifting to contact the housing 50 of the button battery, thereby avoiding a short circuit, prolonging the service life of the button battery, ensuring the stable use in bumpy environments, and improving the use safety.

In step S140, providing a heating plate 40 and heating the heating plate 40 to a preset temperature includes:

providing an arc heating plate 41, a first planar heating plate 42 and a second planar heating plate 43, and heating the arc heating plate 41, the first planar heating plate 42 and the second planar heating plate 43 to a preset temperature which is 100 to 150° C.

Preferably, the preset temperature is 122° C. to 128° C.

The radian of the arc heating plate 41 is 30 rad to 60 rad.

The arc heating plate 41, the first planar heating plate 42 and the second planar heating plate 43 are all made of a heat-conducting material, including but not limited to a metal material, such as copper. The surface of the metal material is coated with a thermal insulation material, including but not limited to a ceramic material.

Preferably, the arc heating plate 41, the first planar heating plate 42 and the second planar heating plate 43 are all made of copper, and the surfaces of the arc heating plate 41, the first planar heating plate 42 and the second planar heating plates 43 are all coated with ceramic with a thickness of 20 μm at the portions in contact with the separator 13.

Figure 3:
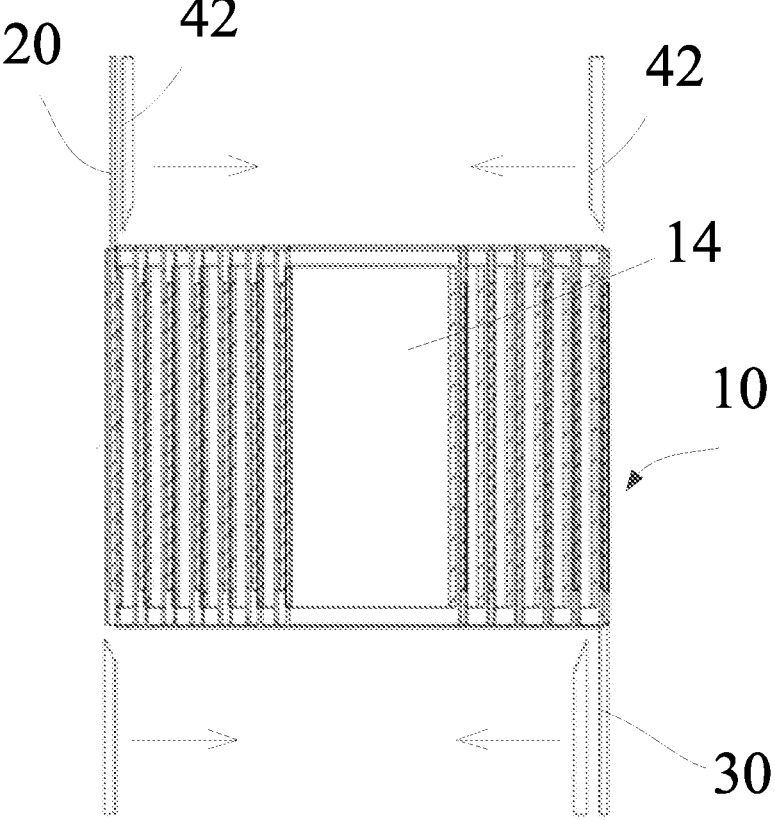
FIG. 3 is a schematic structural diagram in which a first planar heating plate is used to extrude a winding core when a first tab and a second tab are both located in an outer ring of the winding core in a method for manufacturing a battery cell structure of a button battery according to an embodiment of the present disclosure.

In step S150, as shown in FIG. 9 which is a schematic partial structural diagram of the winding core 10 after step S150 is completed, the heating plate 40 scrapes the separator 13 at both ends of the winding core 10 from outside to inside, so that the protruding ends 131 of the separator 13 forms inclined protruding ends 131, which includes:

as shown in FIG. 2 and FIG. 3, the downward pressing heights of the two pairs of the first planar heating plates 42 are controlled so that the scrapers of the two pairs of the first planar heating plates 42 extend to a preset depth position in the protruding ends 131 of the separator 13;

the scrapers of the first planar heating plates 42 move toward the position of the inner hole 14 at the center of the winding core 10, and press the protruding ends 131 laterally so that the protruding ends 131 are inclined toward the inner hole 14 at the center of the winding core 10. Therefore, the width A1 of the separator 13 reaches a value required in this embodiment, that is, 5 mm; alternatively, as shown in FIG. 1, the downward pressing heights of the two pairs of the arc heating plates 41 are controlled so that the scrapers of the two pairs of the arc heating plates 41 extend to a preset depth position in the protruding ends 131 of the separator 13;

the scrapers of the arc heating plates 41 move toward the position of the inner hole 14 at the center of the winding core 10, and presses the protruding ends 131 in arc so that the protruding ends 131 are inclined toward the inner hole 14 at the center of the winding core 10.

Therefore, the width A1 of the separator 13 reaches a value required in this embodiment, that is, 5 mm.

In FIG. 1, a direction indicated by a straight arrow indicates a direction in which the scraper of the arc heating plate 41 scrapes the protruding ends 131 of the separator 13. In FIG. 2 and FIG. 3, a direction indicated by a straight arrow indicates a direction in which the scraper of the first planar heating plate 42 scrapes the protruding ends 131 of the separator 13.

In this embodiment, as shown in FIG. 2, the first tab 20 and the second tab 30 are respectively located at the inner ring of the winding core 10, the adopted heating plates 40 are two pairs of the first planar heating plates 42, and the initial positions of the two pairs of the first planar heating plates 42 are respectively located at two end faces of the winding core 10. The scrapers of the two pairs of the first planar heating plates 42 extend to a preset depth position in the protruding ends 131 of the separator 13, and the two pairs of the first planar heating plates 42 move relative to each other so that the scrapers of the first planar heating plates 42 move toward the position of the inner hole 14 at the center of the winding core 10, and press the protruding ends 131 laterally, so that the protruding ends 131 are inclined toward the inner hole 14 at the center of the winding core 10;

in another implementation of this embodiment, as shown in FIG. 1, the first tab 20 and the second tab 30 are respectively located at the inner ring of the winding core 10, the adopted heating plates 40 are two pairs of the arc heating plates 41, and the initial positions of the two pairs of the arc heating plates 41 are respectively located at the outer sides of two end faces of the winding core 10. The scrapers of the two pairs of the arc heating plates 41 extend to a preset depth position in the protruding ends 131 of the separator 13, and the two pairs of the arc heating plates 41 move relative to each other so that the scrapers move toward the center of the winding core 10, so that the arc pressing protruding ends 131 are inclined toward the center of the winding core 10.

In yet another implementation of this embodiment, as shown in FIG. 3, the first tab 20 and the second tab 30 are respectively located at the outer ring of the winding core 10, the heating plates 40 adopt two pairs of the first planar heating plates 42, and the initial positions of the two pairs of the first planar heating plates 42 are respectively located at two end faces of the winding core 10. The two pairs of the first planar heating plates 42 move relative to each other, and the scrapers of the two pairs of the first planar heating plates 42 extend to a preset depth position in the protruding end 131 of the separator 13, so that the protruding ends 131 are inclined toward the inner hole 14 at the center of the winding core 10 by pressing the protruding ends 131 laterally by the scrapers of two pairs of the first planar heating plates 42.

Specifically, the scrapers of the first planar heating plates 42 and the scrapers of the arc heating plates 41 are all have a length of 20 mm and a width of 1 mm. The end faces of the scrapers of the first planar heating plates 42 and the end faces of the scrapers of the arc heating plates 41 are all have a chamfer angle of 45°.

Figure 4:
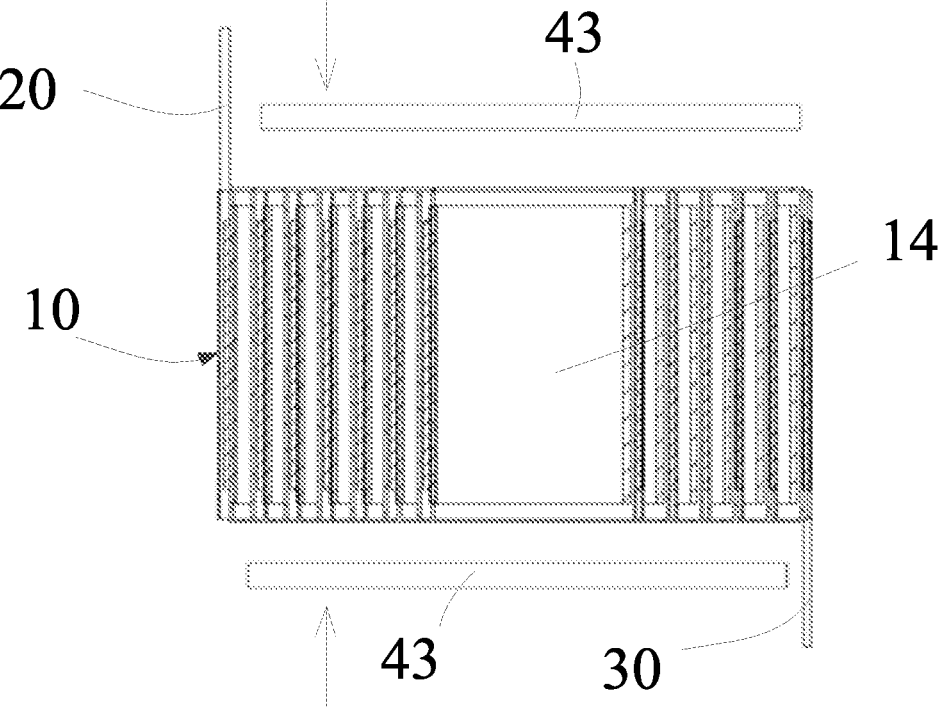
FIG. 4 is a schematic structural diagram in which a second planar heating plate is used to extrude a winding core when a first tab and a second tab are both located in an outer ring of the winding core in a method for manufacturing a battery cell structure of a button battery according to an embodiment of the present disclosure.
Figure 5:
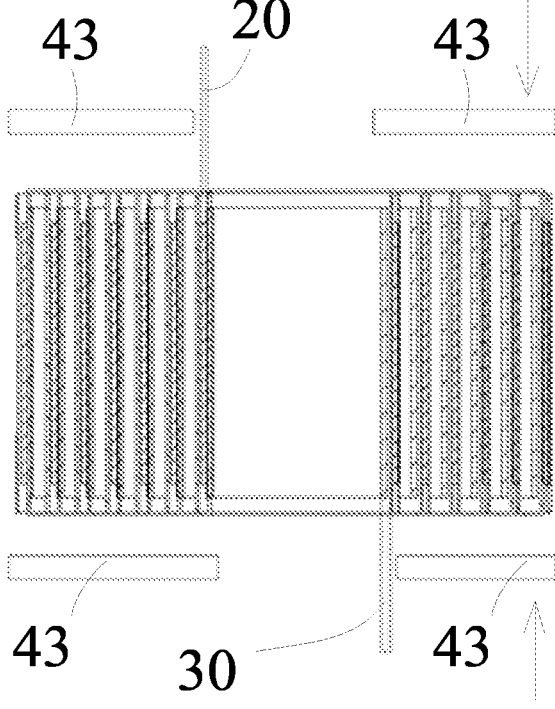
FIG. 5 is a schematic structural diagram in which a second planar heating plate is used to extrude a winding core when a first tab and a second tab are both located in an inner ring of the winding core in a method for manufacturing a battery cell structure of a button battery according to an embodiment of the present disclosure.

In step S160, as shown in FIG. 10 which is a schematic partial structural diagram of the winding core 10 after step S160 is completed, the heating plate 40 thermally presses the inclined protruding ends 131, so that the inclined protruding ends 131 form a separator bonding layer 132 which is sequentially bonded and contracted, which includes:

in FIG. 4 and FIG. 5, a direction indicated by a straight arrow indicates a direction in which the second planar heating plate 43 presses. As shown in FIG. 4 and FIG. 5, the second planar heating plate 43 is used to thermally press the inclined protruding ends 131, so that the adjacent protruding ends 131 are mutually bonded and contracted to form the separator bonding layer 132 that completely wraps the positive electrode sheet 11 and the negative electrode sheet 12.

Specifically, as shown in FIG. 4, the first tab 20 and the second tab 30 are respectively located at the outer ring of the winding core 10, and a pair of the second planar heating plates 43 are used to thermally press the inclined protruding ends 131. In this case, the pair of the second planar heating plates 43 may be of a solid circular structure, and the pair of the second planar heating plates 43 move towards each other, so that the adjacent protruding ends 131 are bonded to each other and contracted to form the separator bonding layer 132 that completely wraps the positive electrode sheet 11 and the negative electrode sheet 12.

As shown in FIG. 5, the first tab 20 and the second tab 30 are respectively located in the inner ring of the winding core 10, and a pair of the second planar heating plates 43 are used to thermally press the inclined protruding ends 131. In this case, the pair of the second planar heating plates 43 may be of a circular structure with a hole in the center, and the pair of second planar heating plates 43 move towards each other, so that the adjacent protruding ends 131 are bonded to each other and contracted to form the separator bonding layer 132 that completely wraps the positive electrode sheet 11 and the negative electrode sheet 12.

The second planar heating plate 43 adapts a circular structure with a diameter of 11 mm.

In this embodiment, the width A2 of the separator 13 reaches the preset value in this embodiment, that is, 4.5 mm, by controlling the temperature and the downward pressing height of the second planar heating plate 43, so that the adjacent protruding ends 131 are bonded to each other and contracted to form a sealed space and the positive electrode sheet 11 and the negative electrode sheet 12 are completely covered by the separator 13. The positive electrode sheet 11 and the negative electrode sheet 12 will not contact with the housing 50 of the battery and other objects no matter how they move in the sealed region formed by the separator 13, thus avoiding the risk of a short circuit caused by the contact of the positive electrode sheet 11 and the negative electrode sheet 12 with the metal housing 50 after they are dislocated in harsh environments, especially in bumpy environments, and greatly improving the safety of the battery cell structure of the button battery.

In step S180, scrapingly pressing the separator 13 at the outermost ring and/or the outermost ring of the winding core 10 to make it bonded to the separator bonding layer 132 includes:

when the first tab 20 and the second tab 30 are respectively located at the outer ring of the winding core 10, the heating plate is a pair of the first planar heating plates 42, which are used to scrapingly press the separator at the outermost ring of the winding core 10, so that the separator at the outermost ring of winding core 10 is bonded to the separator bonding layer 132, thereby improving the sealing performance of the separator bonding layer 132;

when the first tab 20 and the second tab 30 are respectively located at the inner ring of the winding core 10, the adopted heating plate 40 is two pairs of the arc heating plates 41 or a pair of the first planar heating plates 42 to scrapingly press the separator at the innermost ring of the winding core 10, so that the separator at the innermost ring of winding core 10 is bonded to the separator bonding layer 132, thereby improving the sealing performance of the separator bonding layer 132.

In this embodiment, as shown in FIG. 8 and FIG. 9, the separator 13 has a width A of 4 mm-10 mm before the separator bonding layer 132 is formed, and the separator 13 has a width A2 of 3 mm-9 mm after the separator bonding layer 132 is formed by scraping down and inclining the protruding ends 131 of the separator 13 and then hot pressing.

The positive electrode sheet 11 has a width B of 2 mm-8 mm, and the negative electrode sheet 12 has a width C of between 2.5 mm-8.5 mm.

After the separator bonding layer 132 is formed by hot pressing, the length of the separator 13 beyond the positive electrode sheet 11 is 20% to 60%, preferably 30% to 50%, of the length of the separator 13 beyond the positive electrode sheet 11 before the separator bonding layer 132 is formed.

In the description of the present disclosure, it should be understood that the used terms "center", "length", "width", "thickness", "top", "bottom", "upper", "lower", "left", "right", "front", "back", "vertical", "horizontal", "inner", "outer", "axial", "circumferential" and the like indicate the orientation or positional relationship based on the orientation or positional relationship shown in the drawings. It is only for the convenience of describing the present disclosure and simplifying the description, but not for indicating or implying that the locations or elements referred to must have a specific orientation, construction, and operation, therefore, it cannot be understood as limiting the present disclosure.

Furthermore, the terms "first" and "second" are only used for descriptive purposes, and it cannot be understood as indicating or implying relative importance or as implying the numbers of the indicated technical features. Thus, the features defined with "first" or "second" may explicitly or implicitly include one or more of the features. In the description of the present disclosure, "a plurality of" means at least two, such as two, three, etc., unless otherwise clearly defined.

In the present disclosure, unless otherwise clearly specified and defined, the terms "mounted", "connecting", "connected" and "fixed" should be understood broadly. For example, it can be a fixed connection, a detachable connection, or an integrally connection; it can be a mechanically connection, an electrical connection or a mutual communication; it can be a directly connection, an indirectly connection through an intermediary, an internal connection between two components, or the interactive relationship between two components. For those of ordinary skill in the art, the specific meaning of the above terms in the present disclosure can be understood according to specific situations.

In the present disclosure, unless otherwise clearly specified and defined, the description of a first feature being "over" or "under" a second feature may include the first and second features being in direct contact, or the first and second features being in non-direct contact through another feature between them. Also, the description of a first feature being "on", "above", and "on top of" a second feature include the first feature being directly above and diagonally above the second feature, or simply means that the first feature is at a higher level than the second feature. The description of a first feature being "under", "below" and "on the bottom of" a second feature include the first feature being directly below and diagonally below the second feature, or simply means that the first feature is at a lower level than the second feature.

Finally, it should be noted that the foregoing embodiments are merely intended for describing the technical solutions of the present disclosure rather than limiting the present disclosure; although the present disclosure is described in detail with reference to the foregoing embodiments, persons of ordinary skill in the art should understand that the technical solutions described in the foregoing embodiments may be modified or made equivalent substitutions to some or all technical features thereof; and these modifications and substitutions shall not cause the essence of the corresponding technical solutions to depart from the scope of the technical solutions of embodiments of the present disclosure.

What is claimed is:

1. A battery cell structure of a button battery, comprising a winding core (10) which is formed by winding a laminated structure and is provided with a hollow inner hole (14), wherein the winding core (10) is provided with a first tab (20) and a second tab (30), the laminated structure comprises at least one positive electrode sheet (11), at least one negative plate (12), and a separator (13) which separates the at least one positive electrode sheet (11) from the at least one negative electrode sheet (12), characterized in that, at least two ends of the winding core (10) are provided with a separator bonding layer (132) wrapping the winding core (10), and the separator bonding layer (132) is configured to fix a positive electrode sheet (11) and a negative electrode sheet (12), wherein when the first tab (20) is located at an outer ring of the winding core (10), the separator (13) is disposed at an outer side of the positive electrode sheet (11) or the negative electrode sheet (12) connected to the first tab (20);

the separator bonding layer (132) comprises a first separator bonding layer located at an inner side of the first tab (20) and a second separator bonding layer located at an outer side of the first tab (20), and a bonding force of the first separator bonding layer is greater than that of the second separator bonding layer.

2. The battery cell structure of the button battery according to claim 1, wherein the separator (13) extends outwards from both ends of the winding core (10) respectively and forms protruding ends (131), the protruding ends (131) are inclined toward a direction of the hollow inner hole (14) of the winding core (10), and adjacent protruding ends (131) are bonded with each other to form the separator bonding layer (132).

3. The battery cell structure of the button battery according to claim 2, wherein a width D of the protruding ends (131) is greater than or equal to a sum of a thickness of the positive electrode sheet (11), a thickness of the negative electrode sheet (12), and a thickness of the separator (13).

4. The battery cell structure of the button battery according to claim 3, wherein when the first tab (20) is located at an inner ring of the winding core (10), the separator (13) is disposed at an inner side of the positive electrode sheet (11) or the negative electrode sheet (12) connected to the first tab (20);

the separator bonding layer (132) comprises a second separator bonding layer located at an inner side of the first tab (20) and a first separator bonding layer located at an outer side of the first tab (20), and a bonding force of the first separator bonding layer is greater than that of the second separator bonding layer.

5. The battery cell structure of the button battery according to claim 1, wherein an area of the second separator bonding layer covering the first tab (20) accounts for 5% to 30% of an area of the first tab (20).

6. The battery cell structure of the button battery according to claim 4, wherein an area of the second separator bonding layer covering the first tab (20) accounts for 5% to 30% of an area of the first tab (20).

7. The battery cell structure of the button battery according to claim 1, wherein before the separator bonding layer (132) is formed, the separator (13) has a width A of 4 mm-10 mm, and after the separator bonding layer (132) is formed, the separator (13) has a width A2 of 3 mm-9 mm.

8. The battery cell structure of the button battery according to claim 4, wherein before the separator bonding layer (132) is formed, the separator (13) has a width A of 4 mm-10 mm, and after the separator bonding layer (132) is formed, the separator (13) has a width A2 of 3 mm-9 mm.

9. The battery cell structure of the button battery according to claim 7, wherein the positive electrode sheet (11) has a width B of 2 mm-8 mm, and the negative electrode sheet (12) has a width C of 2.5 mm-8.5 mm.

10. The battery cell structure of the button battery according to claim 8, wherein the positive electrode sheet (11) has a width B of 2 mm-8 mm, and the negative electrode sheet (12) has a width C of 2.5 mm-8.5 mm.

11. A button battery comprising the battery cell structure of the button battery according to claim 1, wherein the button battery further comprises a housing (50) in which a holding cavity (51) for holding the battery cell structure of the button battery is provided, a bent portion (21) of the first tab (20) is located on at least one end face of the winding core (10), the bent portion (21) of the first tab (20) contacts the separator bonding layer (132), and the bent portion (21) of the first tab (20) is electrically connected to an end face of the housing (50).

12. The button battery according to claim 11, wherein the separator (13) extends outwards from both ends of the winding core (10) respectively and forms protruding ends (131), the protruding ends (131) are inclined toward a direction of the hollow inner hole (14) of the winding core (10), and adjacent protruding ends (131) are bonded with each other to form the separator bonding layer (132).

13. The button battery according to claim 12, wherein a width D of the protruding ends (131) is greater than or equal to a sum of a thickness of the positive electrode sheet (11), a thickness of the negative electrode sheet (12), and a thickness of the separator (13).

14. The button battery according to claim 13, wherein when the first tab (20) is located at an inner ring of the winding core (10), the separator (13) is disposed at an inner side of the positive electrode sheet (11) or the negative electrode sheet (12) connected to the first tab (20);

the separator bonding layer (132) comprises a second separator bonding layer located at an inner side of the first tab (20) and a first separator bonding layer located at an outer side of the first tab (20), and a bonding force of the first separator bonding layer is greater than that of the second separator bonding layer.

15. The button battery according to claim 11, wherein an area of the second separator bonding layer covering the first tab (20) accounts for 5% to 30% of an area of the first tab (20).

16. The button battery according to claim 14, wherein an area of the second separator bonding layer covering the first tab (20) accounts for 5% to 30% of an area of the first tab (20).

17. The button battery according to claim 11, wherein before the separator bonding layer (132) is formed, the separator (13) has a width A of 4 mm-10 mm, and after the separator bonding layer (132) is formed, the separator (13) has a width A2 of 3 mm-9 mm.

18. The button battery according to claim 14, wherein before the separator bonding layer (132) is formed, the separator (13) has a width A of 4 mm-10 mm, and after the separator bonding layer (132) is formed, the separator (13) has a width A2 of 3 mm-9 mm.

* * * * *